United States Patent [19]

Howarth

[11] Patent Number: 4,957,770
[45] Date of Patent: Sep. 18, 1990

[54] COATING WEIGHT MEASURING AND CONTROL APPARATUS AND METHOD

[75] Inventor: John J. Howarth, Monte Sereno, Calif.

[73] Assignee: Measurex Corporation, Cupertino, Calif.

[21] Appl. No.: 303,451

[22] Filed: Jan. 27, 1989

[51] Int. Cl.⁵ .......................................... B05C 11/10
[52] U.S. Cl. .......................................... 427/9; 73/159;
118/419; 118/429; 118/665; 118/688; 162/198;
162/263; 162/265; 250/339; 427/434.2
[58] Field of Search ............... 118/665, 419, 429, 688;
427/9, 10, 434.2; 250/339; 73/150 R, 159;
162/135, 198, 263, 265

[56] References Cited

U.S. PATENT DOCUMENTS

| 3,525,863 | 8/1970 | Constantine et al. | 378/45 |
| 3,793,524 | 2/1974 | Howarth | 250/339 |
| 3,801,349 | 4/1974 | Wilson et al. | 427/10 |
| 4,006,358 | 2/1977 | Howarth | 162/263 X |
| 4,135,006 | 1/1979 | Readal et al. | 118/665 X |
| 4,340,623 | 7/1982 | Justus | 162/265 X |
| 4,732,776 | 3/1988 | Bossevain | 427/10 |
| 4,789,820 | 12/1988 | Parrent, Jr. et al. | 73/159 X |
| 4,840,706 | 6/1989 | Campbell | 250/339 X |

Primary Examiner—Richard L. Chiesa
Attorney, Agent, or Firm—Spensley Horn Jubas & Lubitz

[57] ABSTRACT

A sensor and a method for determining the basis weight of coating material on a substrate is described. The determined basis weight is insensitive to changes in the amount of substrate material underlying the coating. Signals from the sensor may be used in the control of a coating mechanism to provide a coating having a uniform basis weight.

20 Claims, 3 Drawing Sheets

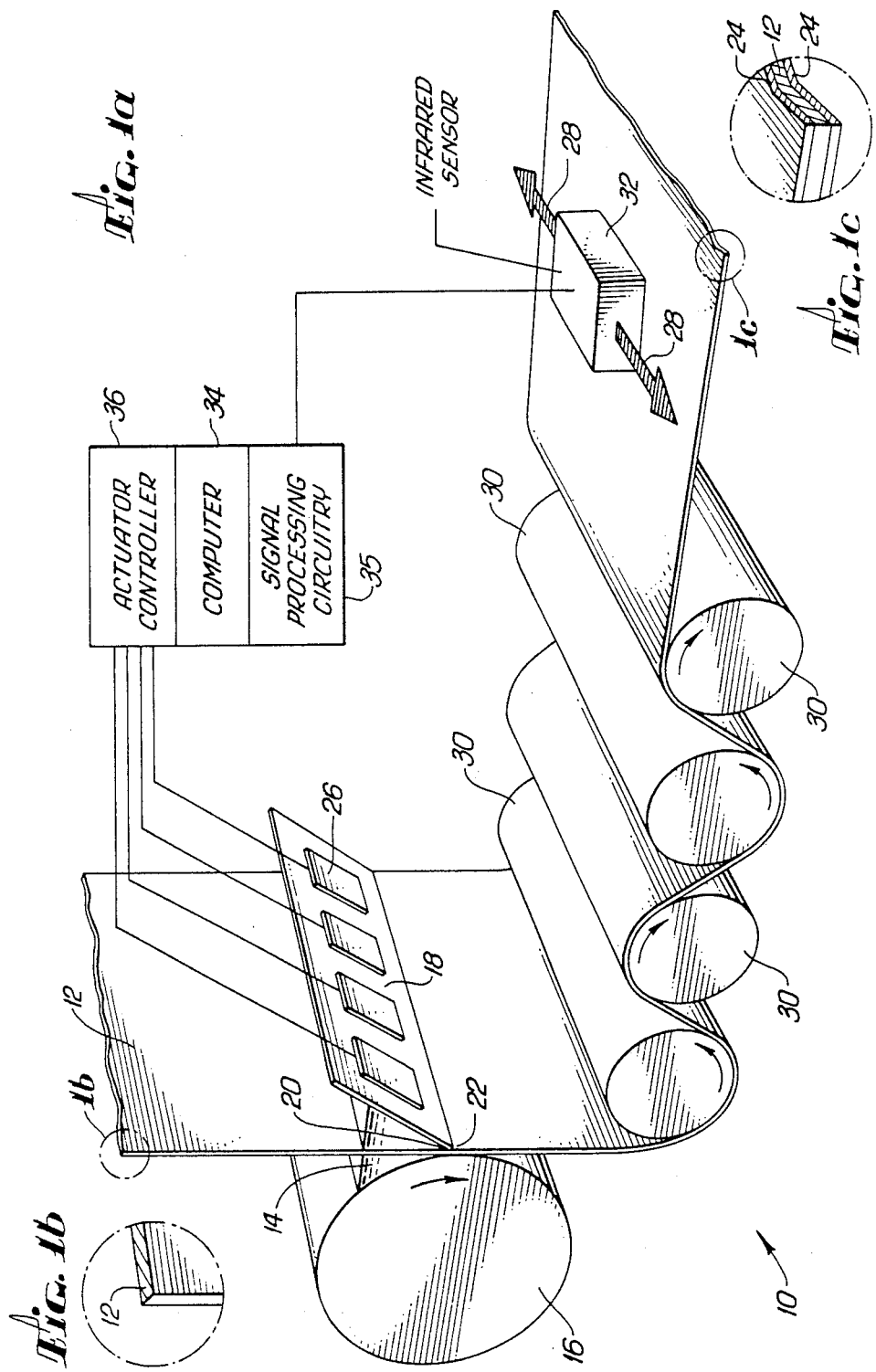

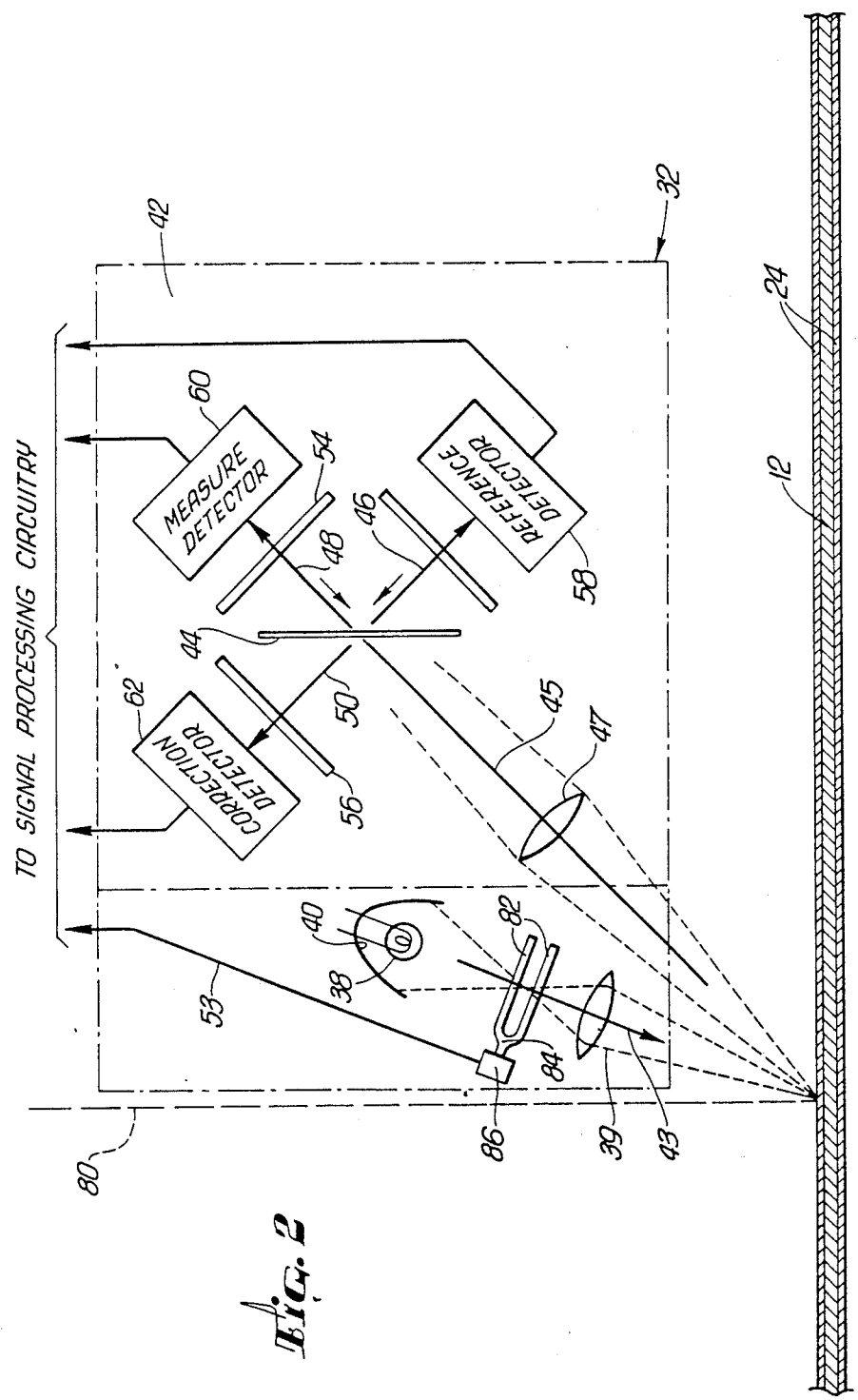

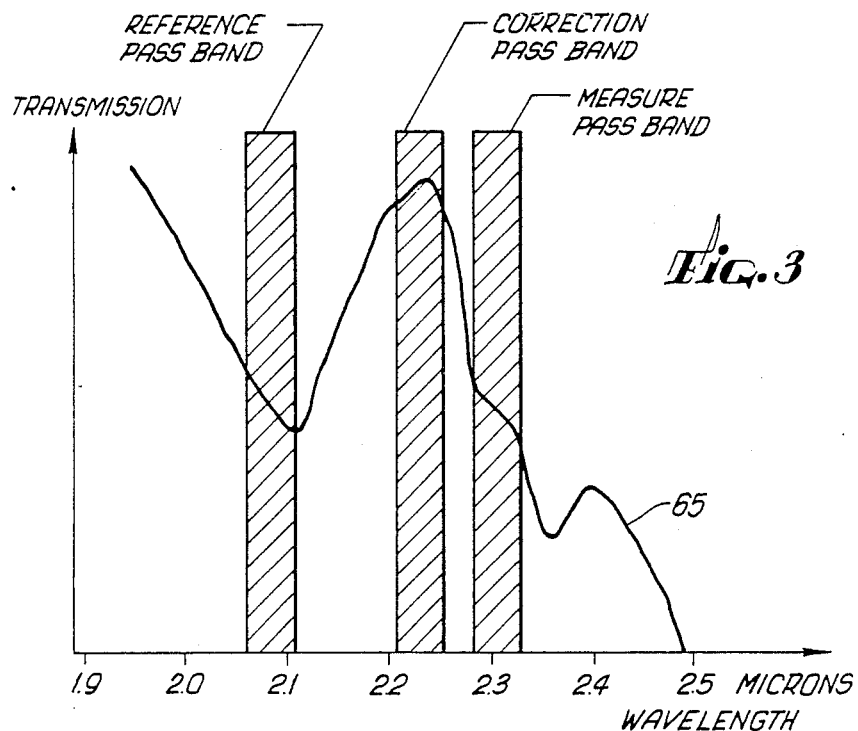
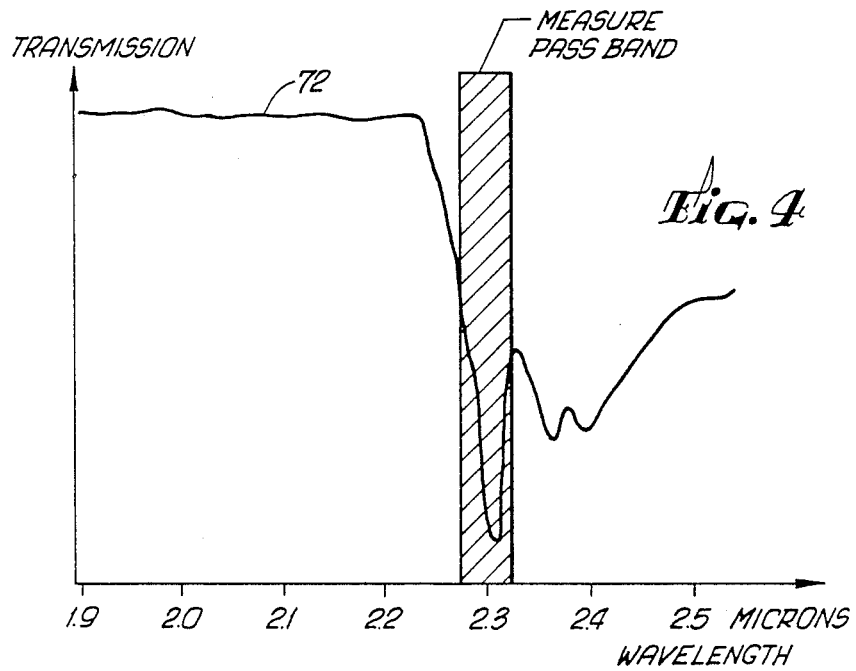

COATING WEIGHT MEASURING AND CONTROL APPARATUS AND METHOD

BACKGROUND OF THE INVENTION

This invention relates to the field of apparatuses and methods for measuring and controlling the amount of a coating applied on paper sheet or other objects, and in particular, to an apparatus and method wherein the basis weight of the coating on a moving paper sheet is monitored and regulated while being applied to the sheet.

In the process of papermaking, it is often desirable to coat a paper sheet (called a "base sheet") with any of a wide variety of materials. For example, paper is often coated with a paint-like substance, frequently composed of a combination of titanium dioxide ($TiO_2$), calcium carbonate ($CaCO_3$), and clay mixed in and held together by a latex binder. Such coatings are usually applied to provide a glossy white surface for magazine pages, gift wrapping, shoe boxes, and the like. Alternatively, or in addition, such coatings may also be intended to render the paper sheet waterproof. As another example of a coating material, microencapsulated ink may be applied as a coating to one side of a sheet of carbonless copy paper.

Such coatings as described above may be applied to paper as part of the papermaking process in a paper mill. Alternatively, previously manufactured paper may be supplied to the coating machine, called a "coater", from large rolls of paper sheet. In either event, the uncoated paper is usually supplied to the coater in sheets that are on the order of 25 feet or more in width measured along the "cross-direction" (i.e., the direction transverse to the direction of movement of the paper along the papermaking and/or coating machine).

Uniformity of coating "basis weight" (i.e., the mass of the coating material on a unit of surface area of the sheet) is often necessary or desirable for various reasons. For example, the printability of glossy paper may be improved by the uniform application of a gloss coating. Also, gloss coatings may contain relatively expensive materials, such as latex and/or $TiO_2$. Accordingly, the manufacturer will want to precisely monitor the coating and control the application of such coating to apply as uniform a coating as possible. In some cases, the evenness of the coating must be controlled within a fraction of a gram/$m^2$. However, because of the lateral extent of the sheet in the cross-direction (25 feet or more) and the requirement of accurately and evenly applying a coating to such sheets, rather complex coaters have been designed and manufactured.

Coaters come in a variety of configurations. One type of coater, called a "blade coater", comprises a rotating backing drum disposed adjacent to one side of a moving paper sheet and a flexible blade disposed adjacent to the opposite side of the sheet. The drum and blade edge extend in the cross-direction of the sheet to form a narrow slot through which the sheet of paper passes. A pool of coating material is retained between the backing drum and the blade, and thus coats the sheet as it passes therebetween. The blade presses against the paper with the coating applied as the sheet exits through the slot, thereby removing excess coating.

It will be appreciated that the separation of the drum from the blade edge is a critical factor in the application of such coatings. The drum is fabricated and installed to high tolerances. To control the thickness of the coating applied to a sheet, coaters provide actuators for adjusting the pressure of the blade edge against the coated sheet, and/or the position of the blade edge relative to the drum. The blade is usually made of a thin steel member which may be slightly bent or flexed. Thus, actuators are installed at intervals along the length of the blade, such that each actuator controls the pressure applied by the blade in the vicinity of the actuator, and therefore, the amount of coating material on the base sheet. The cross-directional length of the blade in the vicinity of each actuator is known as a "slice". Commonly assigned U.S. Pat. No. 4,732,776 to Boissevain discloses a coater including such coating blade actuators. This patent is incorporated herein by reference.

Local variations in temperature and paper thickness, and possibly other factors, if not compensated for, will tend to produce uneven coatings. Therefore, it will be appreciated from the foregoing that the ability to measure the amount of coating material on the coated sheet, and to control the pressure of the blade against the sheet at a plurality of cross-directional slice positions during the coating procedure based upon such measurements will also be important to the papermaker.

Numerous schemes have been attempted to measure and control the amount of coating applied to a sheet. One of the most difficult aspects of the coating control process is obtaining an accurate measurement of the amount of coating applied to a sheet, particularly when the coating amounts must be measured to an accuracy of fractions of a gram/$m^2$.

In one such scheme, a sheet basis weight sensor and a sheet moisture sensor are disposed upstream in the papermaking process before the coater. The basis weight sensor measures the total amount of material in the sheet in terms of mass per unit surface area. Thus, the measured basis weight includes both paper fibers and moisture absorbed by the fibers. Known basis weight sensors utilize the transmission of beta rays through the sheet to determine the basis weight of such sheet. The moisture content of the sheet may be determined, for example, by known infrared moisture sensors which similarly determine the moisture content of the sheet in terms of the mass of water in the sheet per unit surface area of the sheet. Additional basis weight and moisture sensors are then positioned at a point downstream of the coater after the coating process.

The amount of fiber forming the sheet can be determined by subtracting the amount of moisture from the basis weight of the uncoated sheet. Similarly, by subtracting the moisture content of the coated sheet from the basis weight of the coated sheet, the combined amount of coating material and paper fiber can be determined. Finally, by subtracting the amount of fiber in the uncoated sheet from the measurement of combined coating and fiber basis weight in the coated sheet, the basis weight of the coating applied to the sheet is determined. Based upon these measurements of coating basis weight at each slice across the width of the sheet, the system process control computer can then compare such measurements with a predetermined desired coating basis weight value and develop signals to control the coating blade actuators at each slice to achieve the desired coating basis weight across the entire width of the sheet.

Unfortunately, the above-described method is not completely satisfactory since it requires four relatively expensive sensors (i.e., a moisture and basis weight sensor disposed adjacent to the uncoated sheet and additional moisture and basis weight sensors disposed adjacent to the coated portion of the sheet) for determining the basis weight of the coating material. Moreover, the error inherent in the measurement of each of these four sensors may propagate additively through the mathematical calculations necessary to determine coating weight, thereby resulting in a less than ideal measurement of coating basis weight.

Another scheme for measuring the amount of coating material applied to a sheet requires the irradiation of the coated sheet with very high energy x-rays. Such high energy x-rays excite the atoms in the coated sheet material so that such atoms fluoresce. The fluorescing atoms emit x-rays having wavelengths unique to the elements in the coating. Thus, by tuning an x-ray sensor to one or more wavelengths uniquely characteristic of the elements in the coating material, the papermaker can deduce the amount of coating material by the intensity of the fluorescence at the characteristic wavelengths.

Unfortunately, the fluorescence technique is also not completely satisfactory in many instances. For example, the fluorescing atoms emit only low intensity x-rays, thus, this technique produces a relatively low signal to noise ratio. Therefore, relatively long periods of time must elapse before a statistically significant signal can be accumulated by the x-ray detector. Moreover, the high energy exciting x-rays, and the x-rays resulting from the fluorescence of the coated sheet, are dangerous to papermill personnel.

In yet another technique, portions of the sheet are irradiated with x-rays, and the intensity of the x-rays transmitted through the sheet is detected. However, x-rays are absorbed by the mineral filler material frequently used in paper sheet, the wood pulp fibers and the moisture in the sheet. Accordingly, since the transmission of x-rays through the sheet is not solely responsive to the coating material, sensors must be positioned before and after the coater, and the difference in transmission of the x-rays though the coated and uncoated portions of the sheet determined and related to the amount of coating material applied to the sheet. Again, however, this technique suffers from the deficiency that multiple relatively expensive x-ray sources and sensors are required, the error inherent in measurements made by each sensor may additively contribute to the error in the determined amount of coating, and the use of x-rays is, of course, potentially dangerous to papermill personnel.

Accordingly, the present inventor has recognized the need for a simpler, cheaper, more accurate and less dangerous method for determining the amount of coating material on a substrate.

SUMMARY OF THE INVENTION

The present invention includes an apparatus and method which can determine the amount of a coating material on a substrate using measurements of radiation reflected from the substrate, or the transmission of radiation through the substrate, at least at two separate wavelength regions of the electromagnetic spectrum. The apparatus and method are primarily, but not exclusively, intended for on-line coating measurements of a moving paper sheet using infrared radiation. Accordingly, for the sake of simplicity, the present invention will be described in the papermaking context. However, it is to be understood that the invention is applicable to other situations wherein radiation from other regions of the electromagnetic spectrum may be utilized, and wherein the substrate may be sheet materials other than paper, such as plastic, or even wherein the substrate may not be in sheet form.

In papermaking, the infrared coating sensor of the present invention may be scanned back and forth in the cross-direction of a moving coated sheet, to thereby provide a measurement of the basis weight of the coating on the base sheet at various positions along the length and width of the sheet. The sensor is designed to automatically compensate the coating measurement for the effects of changes in the basis weight and moisture content of the base sheet on infrared transmission through or reflectance from the sheet. Therefore, the coating basis weight measurement remains highly accurate as the sensor is scanned across the moving sheet, even if the basis weight of the base sheet or its moisture content are not uniform across the width and length of the sheet.

The infrared coating sensor of the present invention includes a source of infrared radiation. A beam of infrared radiation is transmitted from this infrared source toward the moving sheet. When the beam reaches the sheet, it first passes through the coating material and then into the base paper sheet. A portion of this infrared energy will be transmitted through the sheet. Also, some of the infrared energy, after entering the base sheet, will be reflected back in the general direction of the infrared source. The infrared beam contains a broad range of wavelengths. However, infrared radiation at certain wavelengths is preferentially absorbed by the coating and/or the base sheet itself.

The coating sensor also includes an infrared receiver section. This receiver section may be positioned on the opposite side of the sheet from the infrared source, and thereby measure the intensity of the transmitted infrared beam. Alternatively, the infrared receiver section of the sensor may be positioned on the same side of the sheet as the infrared source, to thereby measure the intensity of the reflected portion of the beam. In either case, the receiver section comprises a beam splitter, at least two infrared detectors and an infrared band pass filter associated with each detector. The beam splitter directs a portion of the infrared beam toward each of the two or more detectors. A separate infrared band pass filter is positioned before each detector. In this way, each of the infrared detectors measures the intensity of only the portion of the infrared beam spectrum which falls within the pass band of the associated filter.

One of the two infrared band pass filters only passes infrared radiation having wavelengths in a selected region of the infrared spectrum wherein the infrared beam is strongly absorbed by the underlying base sheet of paper, but is only very weakly absorbed by the coating material. This first region of the spectrum is called the "reference" region, and the associated detector is called the "reference" detector. The output signal from reference detector is, therefore, primarily dependent upon absorption by the base sheet. For example, when the detected infrared energy has been transmitted through the sheet from one side of the sheet to the other, the amount of absorption will be dependent upon the basis weight of the base paper sheet. Moreover, even if the receiver section and the infrared source are positioned on the same side of the sheet, so that the receiver section detects only reflected infrared radiation, then the output of the reference detector will still be sensitive to changes in the basis weight of the sheet.

This is because the infrared radiation is only partially reflected at the surface of the base sheet. Most of the infrared radiation will penetrate into the sheet, with an increasing proportion of the total beam being reflected as it penetrates deeper into the sheet and/or encounters more sheet material. Thus, all else remaining constant, a higher basis weight sheet will reflect more infrared energy than a lower basis weight sheet. With a lower basis weight sheet, more of the infrared energy will be transmitted through the sheet.

A second band pass filter is associated with the second infrared detector and passes only wavelengths in a region of the infrared spectrum which are strongly absorbed by a selected component of the coating material. This second region of the spectrum, called the "measure" region, is also chosen such that the average absorption of infrared radiation in this region by the base sheet is equivalent to the average absorption by the base sheet of the infrared radiation in the reference region. Accordingly, the measure and reference band pass filters are chosen such that their pass bands correspond to regions of the infrared spectrum which are absorbed to the same extent by the underlying base paper sheet. The detector associated with the "measure" region of the spectrum is called the "measure" detector.

According to the present invention, the ratio (or difference) of the output signals from the reference and measure detectors is determined. Since, as previously mentioned, radiation having wavelengths in the pass bands of both the measure and reference band pass filters is equally absorbed by the base paper sheet, the ratio (or difference) of the signals from the measure and reference detectors will be indicative of the amount of the selected component in the coating. Since, in the usual case, the selected component will be mixed into the coating formula in a known, fixed proportion, the determined amount of the selected component can be correlated with a corresponding amount of coating material. Moreover, because the absorption of the measure and reference wavelengths by the sheet is equal or "balanced", the ratio of (or difference between) the signals from the measure and reference detectors will be independent of the basis weight of the base sheet.

Furthermore, because an infrared source can be made simply by electrically heating a wire, and because infrared radiation has little or no known adverse health effects, the infrared signal can be made as strong as is necessary simply by increasing the surface area and temperature of the heated wire. Also, such an infrared source is far safer than an x-ray radiation source.

As previously mentioned, signals from the coating sensor can be transmitted to a process control computer which performs the above-described mathematical calculations to provide a measurement of amount of coating on the sheet. The computer compares this measurement with a previously entered desired coating amount. The computer then generates a control signal that can be used to regulate coating blade control actuators, and in turn, the amount of coating applied to the base sheet at each cross-directional position. Should conditions arise during the coating procedure which require an adjustment of the coater blade at any cross-directional position to maintain the applied coating at the preselected amount, such an adjustment can be automatically made by transmitting the appropriate signals from the process control computer to one or more blade actuators.

From the above it can be seen that, with the present invention, a high degree of uniformity in the thickness and/or basis weight of the coating applied to paper sheet is achievable using a single, safe and highly accurate coating sensor.

BRIEF DESCRIPTION OF THE DRAWINGS

FIG. 1a is a simplified schematic perspective view of a paper coating operation utilizing a scanning reflectance-type infrared coating sensor according to the present invention.

FIG. 1b is an enlarged view of the uncoated portion of the sheet of FIG. 1a.

FIG. 1c is an enlarged view of the coated portion of the sheet of FIG. 1a.

FIG. 2 is a simplified schematic cross-sectional view of the reflectance-type infrared coating sensor of FIG. 1a.

FIG. 3 illustrates an infrared transmission spectrum for an uncoated paper sheet.

FIG. 4 illustrates an infrared transmission spectrum for the latex-type binder component of a typical sheet-coating material.

DETAILED DESCRIPTION OF THE PREFERRED EMBODIMENT

The following description is of the best presently contemplated mode of carrying out the invention. This description is made for the purpose of illustrating the general principles of the invention and should not be taken in a limiting sense. The scope of the invention is best determined by reference to the appended claims.

FIG. 1a illustrates, although in highly simplified form, a paper sheet coating system 10. As illustrated in this figure, an uncoated sheet of paper 12 is drawn through a supply of coating material 14 contained between a backing roll 16 and a blade 18. An exit slot 20 for the sheet 12 is formed between the roll 16 and the adjacent edge of the blade 22, so that the thickness of the coating on the paper 12 immediately after it exits the slot 20 is determined by the distance and pressure between the blade edge 22 and the roll 16.

Actuators 26 are mounted on the blade 18 at fixed intervals and control the flexion of the blade 18 in the vicinity of each actuator 26 such that, as the actuators 26 move the blade 18 toward and away from the roll 16, the coating material on the sheet 24 is made progressively thinner and thicker, respectively. The actuators 26 are preferably spaced at 3 or 6 inch intervals along the blade 18. As previously mentioned, each 3 or 6 inch interval surrounding each of the actuators 26 is called a "slice".

After the sheet 12 exits the coating thickness control slot 20, the coated sheet 12 passes over a number of heated drums 30 which dry the coating 24. The dried coated sheet 12 then passes under a reflectance-type infrared coating weight sensor 32 which is described in greater detail below.

The sensor 32 is driven back and forth across the width of the sheet 12, in the direction of the arrows 28, in a scanning motion so that it is able to measure the amount of infrared radiation reflected from the sheet 12 at various slice positions across the width and length of the moving sheet 12.

Signals from this sensor 32 are then transmitted, via signal processing circuitry 35, to the system process control computer 34 where the signals are time-wise demultiplexed such that these sensor signals can be related to particular slice positions across the width of the sheet 12. As also described below, the computer 34 then performs various computations, based upon these signals, to determine the basis weight of the coating 24 at each slice. The computer 34 compares the measured coating basis weight for each slice to a predetermined desired value and instructs the actuator controller 36 to develop control signals which cause the actuators 26 to flex the blade 18 at each slice position as needed to provide the desired coating basis weight for each slice. Usually, a uniform coating basis weight will be the desired goal.

The infrared coating, weight sensor 32 of FIG. 1 is illustrated in greater detail in FIG. 2. This sensor 32 is used to measure the amount of the coating material 24 applied to the base paper sheet 12, and automatically compensates this measurement for the affect of infrared absorption by the sheet 12 resulting from changes in the basis weight and moisture content of the sheet 12. The sensor 32 includes an incandescent lamp 38 which is used as the infrared radiation source and an elliptical reflector 40 which directs a beam of infrared radiation 43 from the source 38, through a focusing lens 39, toward the moving, coated paper sheet 12.

In the presently illustrated preferred embodiment, the infrared sensor 32 also includes a receiver section 42 disposed on the same side of the sheet 12 as the infrared source 38 and which detects the reflected portion 45 of the incident infrared beam 43. However, for lightweight paper sheet, wherein a substantial portion of the infrared radiation could penetrate through the entire thickness of the sheet 12, the receiver section 42 of the sensor 32 may be located on the opposite side of the sheet 12 from the infrared source 38. In this event, wherein the infrared source 38 and receiver section 42 of the sensor 32 are located on opposite sides of the sheet 12, it may be desirable, but not necessary to the invention, that the infrared beam 43 be reflected back and forth between the source and receiver sides of the sensor before entering lens 47 and subsequently being detected by detectors 58, 60 and 62. When the beam 43 is thus reflected repeatedly through the sheet 12 in its journey from the infrared source 38 to the receiver section 42, it has multiple opportunities to interact with the coating 24 and the base sheet 12, thereby providing greater sensitivity in determining coating basis weight. Such multiple reflections may be achieved by positioning the receiver section 42 on the opposite side of the sheet 12 relative to the source 38, but laterally offsetting the receiver section 42 from the infrared source 38, rather than directly opposing the receiver section 42 to the source 38. Parallel reflective surfaces (not shown) on opposite sides of the sheet serve to repeatedly reflect the beam 43 through the sheet 12 and coating 24 on its journey from the source 38 to the receiver section 42. Various arrangements for achieving such multiple reflections through the sheet 12 are disclosed in commonly assigned U.S. Pat. No. 3,793,524 to Howarth. This patent is incorporated herein by reference.

As also illustrated in FIG. 2, the receiver section 42 of the sensor includes a beam splitter 44 which splits the reflected infrared beam 45 into three separate beams, 46, 48 and 50. Each of these beams is directed at a separate band pass filter, 52, 54 and 56, positioned in the path of each of the beams immediately before a detector (typically a lead sulfide detector), 58, 60 and 62. Each filter 52, 54 and 56 is selected and aligned relative to the incoming beams 46, 48 and 50, so that each of these filters pass infrared radiation in a separate region of the infrared spectrum. Infrared radiation not within the pass band of the various filters, 52, 54 and 56 is reflected by these filters 52, 54, and 56 back to the beam splitter 44, and thus does not reach the associated detector. As a result, a single relected beam 45 is directed from lens 47 to the beam splitter 44, but the combination of the beam splitter 44 and the filters 52, 54 and 56 split the single beam 45 into three separate beams, 46, 48 and 50, each detected by a different infrared detector 58, 60 and 62, respectively. The purpose of the third "correction" band pass filter 56 and the correction detector 62 will be described below.

In certain situations, it may be preferred, to modulate, at a known frequency, the amount of infrared radiation impinging upon the sheet 12 from the infrared source 38. This modulation may be accomplished by any one of several devices. For example, as illustrated in FIG. 2, the tines 82 of a tuning fork 84 may be disposed in the path of the infrared beam 43. The vibrating tines 82 modulate the infrared beam 43 as the tines 82 move alternately into and out of the path of the beam 43. Alternatively, an opaque disk (not shown), having a plurality of evenly spaced radial slots, may be rotated in the path of the beam 43 so that the beam 43 is alternately transmitted through the slots and blocked by the opaque portions of the disk. With either device, the beam 43 is modulated at a known frequency. Thus, the output of each infrared detector, 58, 60 and 62, is also sinusoidally modulated at the same known frequency as the incident infrared beam 43. Moreover, since the detector outputs are directly dependent upon the reflected portion 45 of the modulated incident beam 43, the phase of the detector outputs will be dependent upon the phase of the modulated beam 43. However, infrared energy originating from the base paper sheet 12, the coating on the sheet 24, and other external sources (not shown), will also reach the detectors, 58, 60 and 62. Thus, each detector signal will include both an AC and DC component.

The output of each of the three detectors, 58, 60 and 62, is transmitted to the signal processing circuitry 35 (FIG. 1a). This circuitry is designed to filter out the DC component of the detector signals. The filtered AC detector signals are then passed on to a phase synchronous demodulation circuit included within the signal processing circuitry 35. The purpose of the phase synchronous demodulator is to filter out changes in the detector signals which are not caused by the varying infrared absorption of the base sheet 12 or the coating material 24 applied to the base sheet 12. For example, 60 Hz line noise in the detector signals is filtered out by the demodulator circuit, as explained below.

A sine wave oscillator 86 is used to drive the tines 82 of the tuning fork 84 at the resonant frequency of the tuning fork 84. The output of this sine wave oscillator 86, in addition to driving the tuning fork 84, is also transmitted along line 53 to the signal processing circuitry 35 which converts the sine wave to a square wave having the same phase as the output signals from the infrared detectors 5, 60 and 62. This square wave is then fed to the phase synchronous demodulator portion of the signal processing circuitry 35 along with the filtered signals from each of the three infrared detectors, 58, 60 and 62. The signals from the infrared detectors, 58, 60 and 62 are, of course, modulated at the same frequency as the output of the tuning fork oscillator 86. Hence, by demodulating the outputs from each of the detectors 58, 60 and 62 with a square wave having the same frequency and phase, and then averaging the demodulated outputs over a number of cycles, changes in the detector signals which result from changes in the intensity of external infrared sources, or extraneous signals such as 60 Hz line voltage, are removed from the coating basis weight measurement. Changes in the intensity of the infrared energy reaching the detectors 58, 60 and 62 from other external sources or 60 Hz line noise from the power supply could produce erroneous coating measurements.

The averaged amplitude of the demodulated signals from each detector, 58, 60 and 62, is indicative of the amount of infrared radiation being reflected from various portions of the coated sheet within the pass bands of the filters 52, 54 and 56 associated with each detector 58, 60 and 62, respectively. The amplitudes of these amplitude averaged and demodulated detector signals are then measured by the signal processing circuitry, digitized and fed to the process control computer 34. The computer 34 computes the basis weight of the coating material 24 on the base sheet 12 utilizing the equations and techniques more fully described below.

FIG. 3 illustrates the infrared transmission spectrum 65 for an uncoated paper sheet 12 and the pass bands for the reference 52, correction 56 and measure 54 filters associated, respectively, with the reference 58, correction 62 and measure 60 infrared detectors. The reference 52 and measure 54 band pass filters are chosen such that the average absorption of infrared radiation by the base paper sheet 12 in their respective pass bands is equal, or as nearly equal as practical. In this way, the signals produced by the reference 58 and measure 60 detectors will be equal (or very nearly equal) for an uncoated sheet 12. However, FIG. 4 illustrates an infrared transmission spectrum 72 for latex and, as illustrated in this figure, the pass band of the measure detector filter 54 also falls squarely within a strong absorption peak (or transmission minimum) for latex. Accordingly, with a coated sheet, the output from the measure detector 60 will be indicative of infrared absorption caused by both the base paper sheet 12 and the latex component of the coating material 24.

Even at its absorption peak, however, latex at typical concentrations only very weakly absorbs infrared radiation. Accordingly, with respect to the amount of absorption attributable to the latex coating component, the signal-to-noise ratio from the measure detector 60 is so low that the measure detector 60 itself cannot practically be used to determine the amount of latex encountered by the reflected infrared beam 45. Nevertheless, with the present invention, because the reference 58 and measure 60 detectors are equally sensitive to the underlying base paper sheet 12, the ratio of the magnitude of the reference signal to the magnitude of the measure signal yields a signal indicative of the latex content in the coating material 24. Similarly, the difference in the magnitude of the reference and measure signals will also provide an indication of the latex content in the coating material 24. Moreover, because the reference and measure signals are subject to the same major sources of error (e.g., changes in sheet basis weight, moisture content and dust in the optical path), the ratio or difference between the measure and reference signals will provide a highly accurate indication of the amount of latex overlying the base paper sheet 12, even if the phase synchronized demodulation filtering technique discussed above is not utilized.

When setting up the coating weight sensor 32, it is important to "balance" or equalize the absorption of infrared radiation by the base sheet 12 in the measure and reference pass bands. Known infrared band pass filters are made by coating a quartz substrate with a dielectric coating. The thickness of the dielectric coating determines the center of the pass band for the filter. Accordingly, by varying the thickness of the dielectric film, filters can be made to have a pass band at any desired region of the infrared spectrum. Alternatively, the pass band can be shifted to shorter wavelengths, at least to some extent, by tilting the filter such that the incoming infrared beam strikes the filter at an angle from the surface normal. In this manner, the pass band can be fine tuned so as to exactly balance the absorption by the base sheet 12 of the radiation in the reference and measure bands.

As previously mentioned, when setting up the sensor 32 of the present invention, infrared band pass filters 52 and 54 are selected, and possibly tilted, to equalize the average absorption of the infrared radiation by the base paper sheet 12 in the reference and measure bands. However, in certain situations, it may be difficult or impossible to exactly balance the absorption in the reference and measure bands. As a result, the ratio or difference between the reference detector signal and the measure detector signal may not completely cancel out the effects of variations in the basis weight of the base sheet 12, or the moisture content of the base sheet 12. In this situation, a third correction detector 62 can be utilized. The correction detector 62 and associated filter 56 are illustrated in FIG. 2. The correction detector 62 is used in conjunction with an infrared band pass filter 56 having a pass band (illustrated in FIG. 3) at a transmission peak for paper between the measure and reference pass band wavelengths. The pass band for the correction filter 56 is chosen at a location of the infrared spectrum which is only very weakly absorbed by latex. Accordingly, the output signal of the correction detector 62 is primarily indicative of the basis weight of the base sheet 12. In the situation wherein the reference and measure detectors are not exactly balanced, the output signal of the correction detector 62 can be used to mathematically correct for the imbalance, utilizing, for example, the following equation:

$$BW_c = A(1/I_{MES} - 1/I_{REF}) + B/I_{CORR} \tag{1}$$

Wherein:
$BW_c$ = the basis weight of the coating material on the base sheet;
$I_{MES}$ = the value of the output signal from the measure detector;
$I_{REF}$ = the value of the output signal from the reference detector;
$I_{CORR}$ = the value of the output signal from the correction detector; and
A and B = constants.

A and B are determined empirically and relate the various detector outputs to the coating basis weight. The value of these constants may be determined by well known curve fitting techniques.

The values of $I_{MES}$, $I_{REF}$ and $I_{CORR}$ are proportional to the transmittance of the infrared radiation through the coated sheet in the measure, reference and correction pass bands, respectively.

When the sensitivity of the reference and measure detectors to the base paper sheet can be closely equalized, so as to produce the desired insensitivity to changes in base sheet basis weight and moisture content, then the $B/I_{CORR}$ term of equation (1) is small and sometimes may be omitted.

Equation (1) relies upon the difference between the output signals from the reference and measure detectors to determine the basis weight of the coating material. However, as previously mentioned, it is also possible to determine the coating basis weight using ratios of these two signals. In this latter case, the following equation may be used:

$$BW_c = C\left[\frac{I_{REF}/I_{MES}}{S\left(\frac{I_{CORR}}{I_{REF}} - 1\right) + 1} - 1\right] \quad (2)$$

Wherein:

$BW_c$, $I_{MES}$, $I_{REF}$ and $I_{CORR}$ are the same as for equation (1);

C is an empirically determined constant which relates the various detector outputs to coating basis weight; and S equals the slope of an empirically determined graph which plots $I_{REF}/I_{MES}$ on the ordinate against $I_{CORR}/I_{REF}$ on the abscissa for varying base sheet basis weights of uncoated sheet material.

The term $$S\left(\frac{I_{CORR}}{I_{REF}} - 1\right)$$

adjusts equation (2) for any inbalance in the absorption of the base sheet of infrared radiation within the reference and measure bands. Accordingly, when absorption by the base sheet of infrared radiation in these two bands is very nearly balanced, then equation (2) may be simplified thus:

$$BW_c = C(I_{REF}/I_{MES} - 1). \quad (3)$$

A computer (not shown) may be associated with the coating weight sensor 32 and dedicated solely to performing the basis weight calculations for each slice. However, many modern paper mills are highly automated and include a process control computer 34 (FIG. 1a). In these mills, the signals produced by the infrared coating sensor 32 of the present invention are preferably fed to the mill's central process control computer 34, via signal processing circuitry 35, for computation of the amount of coating material 24 being applied to the sheet 12 at each cross-directional slice location, as described above. Then, based upon these computations, the process control computer 34 can instruct the actuator controller 36 to develop signals to selectively activate the coating control blade actuators 26 mounted at each slice along the blade 18 to selectively alter the amount of coating material 14 applied to the base sheet 12 at each cross-directional location.

The preferred center wavelength for the pass bands of the reference, measure and correction band pass filters are 2.09 μm, 2.30 μm and 2.23 μm, respectively. The band width for each of these filters is preferably about 0.05 μm, but can be wider or narrower as is needed to obtain the desired signal strength and balance at the detectors.

As illustrated in FIG. 2, the reflection-type infrared coating sensor 32, directs a beam 43 of infrared radiation toward the coated sheet 12 at an angle of 10° from the normal 80 to the sheet surface. Moreover, to avoid strong reflections of infrared radiation from the surface of the coating material 24, the receiver section 42 of the sensor 32 is preferably constructed to detect infrared radiation reflected from the coated sheet at an angle of 15° from the same side of the normal 80 as the infrared source 38.

Because of economic and environmental concerns, the paper making industry is increasingly utilizing recycled paper. The recycled paper may include carbon from ink used to print on the original sheet material, as well as latex which may have originally been applied as a sheet coating but which, during the recycling process, has been incorporated into the recycled base sheet material.

An advantage of the present invention is that the carbon associated with ink absorbs infrared radiation with equal efficiency across the entire region of interest of the infrared spectrum. Accordingly, during operation of the present invention, there is no need to rebalance the reference and measure detectors, 58 and 60, when recycled paper including carbon-based ink is incorporated into the manufacturing process.

On the other hand, it may happen that latex is also incorporated into the base sheet. In this situation, a secondary infrared sensor (not shown), similar or identical to the primary infrared sensor 32 described above, is positioned at a location in the paper coating process prior to the application of the coating material 14 to the base sheet. This secondary sensor is disposed adjacent to the uncoated base sheet and utilized to measure the amount of latex in the base sheet in exactly the same manner as described above for the primary sensor. In this situation, the process control computer 34 receives signals from the secondary sensor, computes the amount of latex incorporated into the base sheet, and subtracts this latex measurement from the latex measurement resulting from the signals supplied to the computer 34 by the primary coating sensor 32. The difference resulting from this subtraction is indicative of the amount of latex in the coating material applied to the recycled base paper sheet. Coating control is then conducted in a manner identical to that previously described.

Finally, as previously mentioned, latex is usually utilized as a binder in the coating material which may include a number of other chemical components such as dies, fillers, etc. These components are mixed together in precise, known and predetermined proportions with the latex component of the coating material. Accordingly, by determining the amount of the latex component overlying a sheet, the system process control computer can also determine the total amount of the entire coating material mixture on the sheet from the known proportions of the other components of the coating material to the latex component.

One embodiment of the present invention has been described in detail above. Nevertheless, it is understood that one may make various modifications without departing from the spirit and scope of the invention. For example, where the coating material includes microencapsulated ink for carbonless copy paper, the present invention can be utilized as described above to measure and control the amount of ink applied to such paper based upon measurements of the latex in the encapsulating material. Moreover, the present invention is not limited to use with paper, nor with latex-based coating materials, nor with infrared radiation. The present invention is also applicable to other substrate materials and to other coating materials as well as to regions of the electromagnetic spectrum other than the infrared region. Furthermore, although it is generally desirable to choose the reference wavelength region such that the radiation within the reference region is only weakly absorbed by the selected coating component, it is sufficient for the operation of a device embodying the invention that the radiation in the first and second wavelength regions simply be unequally sensitive to absorption by the selected coating component. Thus, the scope of the invention is not limited to the embodiment described in detail herein.

I claim:

1. A coating sensor for sensing a coating material on a substrate, wherein the coating material includes at least one component, the sensor comprising:
   a radiation source disposed to direct a beam of radiation into the coated substrate;
   a radiation receiver disposed to detect at least a portion of the beam emerging from the coated substrate, the receiver being configured to detect the amount of radiation in first and second separate wavelength regions of the radiation spectrum and to produce first and second signals therefrom, respectively indicative of the amount of detected radiation in the first and second regions, and wherein the first region is selected for radiation which is sensitive to the amount of substrate underlying the coating and the second region is selected for radiation which is approximately equally as sensitive as radiation in the first region to the amount of substrate underlying the coating, but which is also sensitive to the one component of the coating, the sensitivity of the radiation in the first region to the one component being different than the sensitivity of the radiation in the second region to the one component.

2. A coating sensor as in claim 1, wherein the radiation is infrared radiation.

3. A coating sensor as in claim 1, wherein the substrate is paper, the one component is latex, the first region is approximately centered around 2.09 $\mu$m and the second region is approximately centered around 2.30 $\mu$m.

4. A coating sensor as in claim 1, further comprising computing means operatively coupled to the receiver for computing the amount of the one component on the substrate based upon the first and second signals.

5. A coating sensor as in claim 1, further comprising computing means for computing the amount of coating material on the substrate based upon the first and second signals.

6. A coating sensor as in claim 5, wherein the substrate is a moving sheet material having a variable basis weight and the receiver is configured to detect the amount of radiation in a separate third wavelength region of the infrared spectrum and to produce a third signal therefrom indicative of the basis weight of a portion of the sheet, the computing means being programmed to determine the basis weight of the coating material on said sheet portion based upon the third signal in addition to the first and second signals.

7. A coating sensor as in claim 1, further comprising:
   a scanning mechanism, having the receiver attached thereto, for scanning the receiver back and forth along a line; and
   a computer operatively coupled to the receiver for receiving the first and second signals and determining the amount of coating material on the substrate at various positions of the substrate traversed by the scanning sensor based upon the first and second signals.

8. A coating system, comprising:
   a sheet coating apparatus for applying a coating material made from at least one component to the surface of a moving sheet, the coating apparatus including a metering element for regulating the amount of the coating material which remains on the sheet after the moving sheet passes by the metering element;
   a first coating sensor disposed adjacent to the coated sheet and including a first radiation source disposed to direct a first beam of radiation into the base sheet, and a first radiation receiver positioned to detect at least a portion of the first beam emerging from the coated sheet, the first receiver being configured to detect the amount of radiation in first and second separate wavelength regions of the electromagnetic spectrum and to produce first and second signals therefrom, respectively indicative of the amount of detected radiation in the first and second regions, and wherein the first region is selected for radiation which is sensitive to the basis weight of the base sheet and the second region is selected for radiation which is approximately equally as sensitive as the radiation in the first region to the basis weight of the base sheet, but which is also sensitive to the one component of the coating material, the sensitivity of the radiation in the first region to the one component being different than the sensitivity of the radiation in the second region to the one component;
   a computer operatively coupled to the first receiver for computing the amount of coating material on the sheet from the first and second signals, the computer producing a third signal indicative of the computed coating amount; and
   at least one actuator, operatively coupled to the computer and to the metering element, for adjusting the metering element in response to the third signal to regulate the amount of the coating material on the base sheet.

9. A coating system as in claim 8, wherein the radiation is infrared radiation.

10. A coating system as in claim 9, wherein the moving base sheet has the one component incorporated therein, the system further comprising:
    a second coating sensor disposed adjacent to the uncoated sheet and including a second radiation source disposed to direct a second beam of radiation into the uncoated base sheet, and a second radiation receiver positioned to detect at least a portion of the second beam emerging from the uncoated sheet, the second receiver being configured to detect the amount of radiation in third and fourth separate wavelength regions of the electromagnetic spectrum and to produce fifth and sixth signals therefrom, respectively indicative of the amount of detected radiation in the third and fourth regions, and wherein the third region is selected for radiation which is sensitive to the basis weight of the uncoated base sheet and the fourth region is selected for radiation which is approximately equally as sensitive as the radiation in the third region to the basis weight of the uncoated base sheet, but which is also sensitive to the one component incorporated into the uncoated base sheet, and wherein the computer is operatively coupled to the second receiver for computing the amount of the one component incorporated into the base sheet based upon the fifth and sixth signals, and wherein the computer computes the amount of coating material on the sheet from the fifth and sixth signals in addition to the first and second signals.

11. A coating system as in claim 10, wherein the first region is the same as the third region and the second region is the same as the fourth region.

12. A coating system as in claim 8, wherein the base sheet is paper, the one component is latex, the first region is approximately centered around 2.09 $\mu$m and the second region is approximately centered around 2.30 $\mu$m.

13. A coating system as in claim 8, further comprising a scanning mechanism, having the first sensor attached thereto, for scanning the first sensor back and forth along a line, and wherein the computer is programmed to determine the amount of coating material on the sheet at various cross-directional positions of the sheet traversed by the scanning first sensor based upon the first and second signals.

14. A coating system as in claim 8, wherein the base sheet has a variable basis weight and the first receiver is configured to detect the amount of radiation in a separate third wavelength region of the electromagnetic spectrum and to produce a fourth signal therefrom indicative of the basis weight of a portion of the sheet, the computer programmed to determine the basis weight of the coating material on said sheet portion based on the fourth signal in addition to the first and second signals.

15. A method for sensing a coating material on a substrate, wherein the coating material includes at least one component, comprising steps of:

irradiating the coated substrate with radiation including wavelengths in at least first and second separate wavelength regions of the electromagnetic spectrum;

detecting the amount of radiation emitted from the substrate and coating material in the first and second separate regions, the first and second regions being selected such that the radiation in the first region is sensitive to the amount of substrate underlying the coating material and the radiation in the second region is approximately equally as sensitive to the amount of substrate underlying the coating material as the radiation in the first region, and further wherein the radiation in the first and second regions have unequal sensitivity to the amount of the one component in the coating.

16. A method as in claim 15, wherein the radiation is infrared radiation.

17. A method as in claim 15, wherein the substrate is paper, the one component is latex, the first region is approximately centered around 2.09 $\mu$m and the second region is approximately centered around 2.30 $\mu$m.

18. A method as in claim 15, further comprising the step of computing the amount of the one component on the substrate based upon the detected amount of radiation in the first and second wavelength regions.

19. A method as in claim 15, further comprising the step of computing the amount of coating material on the substrate from the detected amount of radiation in the first and second wavelength regions.

20. A method as in claim 19, wherein the substrate is a moving sheet material having a variable basis weight, further comprising the step of detecting the amount of radiation emitted from the coated sheet in a separate third wavelength region indicative of the basis weight of a portion of the sheet and wherein the computing step includes computing the basis weight of the coating material on said sheet portion based upon the amount of detected radiation in the first, second and third wavelength regions.

* * * * *